United States Patent
Xu et al.

(10) Patent No.: US 11,162,969 B2
(45) Date of Patent: Nov. 2, 2021

(54) UNDERWATER DETECTOR, INSTRUMENT AND METHOD FOR MEASURING VELOCITY AND DIRECTION OF GROUNDWATER

(71) Applicant: SHANDONG UNIVERSITY, Shandong (CN)

(72) Inventors: Zhenhao Xu, Jinan (CN); Dongdong Pan, Jinan (CN); Yichi Zhang, Jinan (CN); Peng Lin, Jinan (CN); Huihui Xie, Jinan (CN); Yuchao Du, Jinan (CN); Zehua Bu, Jinan (CN); Xiaote Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/253,649

(22) PCT Filed: Jan. 21, 2020

(86) PCT No.: PCT/CN2020/073542
§ 371 (c)(1),
(2) Date: Dec. 18, 2020

(87) PCT Pub. No.: WO2020/181930
PCT Pub. Date: Sep. 17, 2020

(65) Prior Publication Data
US 2021/0263062 A1 Aug. 26, 2021

(30) Foreign Application Priority Data
Mar. 14, 2019 (CN) .......................... 201910195089.4

(51) Int. Cl.
*G01P 5/02* (2006.01)
*G01P 13/04* (2006.01)

(52) U.S. Cl.
CPC .............. *G01P 5/02* (2013.01); *G01P 13/045* (2013.01)

(58) Field of Classification Search
CPC .................................. G01P 5/02; G01P 13/045
(Continued)

(56) References Cited

U.S. PATENT DOCUMENTS 3,875,791 A * 4/1975 Fitzgerald .............. G01N 11/14
73/54.31

FOREIGN PATENT DOCUMENTS

| CN | 202815004 U | | 3/2013 |
| CN | 105486351 A | * | 4/2016 |

(Continued)

OTHER PUBLICATIONS

Translation of CN-105486351-A (Year: 2016).*
(Continued)

*Primary Examiner* — Nathaniel T Woodward
(74) *Attorney, Agent, or Firm* — Oliff PLC

(57) ABSTRACT

An underwater detector includes a sealed enclosure, inside an infrared sensor module is disposed. The module rotates around a spindle at a fixed angular velocity along a horizontal plane. An electronic compass disposed on the module. A bottom of the sealed enclosure connected to an indicator through a rotary shaft, and the indicator rotates around the rotary shaft on the horizontal plane. The indicator includes a head and tail fin. A light source emits a light beam vertically upwards on the tail fin. The module is configured to trigger, when receiving the light beam, the electronic compass records a real-time direction relative to the spindle, which is processed by a processor module to obtain a direction of the water flow. A spring connects between the (Continued)

head and tail fin. The infrared sensor module transmits a moment of receiving the light beam to the processor module to calculate the water flow.

10 Claims, 2 Drawing Sheets

(58) Field of Classification Search
USPC ..................................................... 73/152.34
See application file for complete search history.

(56) References Cited

FOREIGN PATENT DOCUMENTS

| CN | 105486351 A | 4/2016 |
|---|---|---|
| CN | 207557289 U | 6/2018 |
| CN | 109959802 A | 7/2019 |
| GB | 2158251 A | 11/1985 |

OTHER PUBLICATIONS

Apr. 9, 2020 International Search Report issued in International Patent Application No. PCT/CN2020/073542.

Apr. 9, 2020 Written Opinion issued in International Patent Application No. PCT/CN2020/073542.

\* cited by examiner

UNDERWATER DETECTOR, INSTRUMENT AND METHOD FOR MEASURING VELOCITY AND DIRECTION OF GROUNDWATER

BACKGROUND

Technical Field

The present disclosure belongs to the field of hydro-geological parameter measurement, and particularly, relates to an underwater detector, and an instrument and method for measuring velocity and direction of a groundwater flow.

Related Art

The description in this section merely provides background information related to the present disclosure and does not necessarily constitute the prior art.

Determining of velocity and direction of a groundwater flow, particularly, velocity and direction of a groundwater flow in a hydrological observation borehole during hydro-geological drilling, is of great significance to mine production and underground construction. The velocity and the direction of the groundwater flow are closely related to a permeability coefficient. Accurate hydro-geological parameters are of great significance to construction. The inventor finds that existing methods for measuring velocity and direction of a groundwater flow often have the problems of low measurement accuracy, large operational constraints, and high cost.

SUMMARY

A first aspect of the present disclosure provides an underwater detector that has effects of proper cost, good applicability, and high precision.

A technical solution of the underwater detector according to the first aspect of the present disclosure is:

an underwater detector, including:

a sealed enclosure, inside which a spindle, an infrared sensor module, and a processor module are disposed, where the infrared sensor module is capable of rotating around the spindle at a fixed angular velocity along a horizontal plane; an electronic compass is disposed on the infrared sensor module; and a bottom of the sealed enclosure is connected to an indicator through a rotary shaft, and the indicator is capable of freely rotating around the rotary shaft on the horizontal plane under the action of a water flow;

the indicator includes a head and a tail fin, a light source configured to emit a light beam vertically upwards is disposed on the tail fin, and the light beam can be received by the infrared sensor module; the infrared sensor module is configured to trigger the electronic compass to work when receiving the light beam, and the electronic compass is configured to record a real-time direction thereof relative to the spindle, which is then processed by the processor module to obtain a direction of the water flow; and a spring is connected between the head and the tail fin; the infrared sensor module is further configured to directly transmit a moment of receiving the light beam to the processor module; and the processor module is configured to calculate a velocity of the water flow according to known relational expressions between a spring strain, a light beam signal appearance time, and a velocity of a water flow.

A second aspect of the present disclosure provides an instrument for measuring velocity and direction of a groundwater flow that has effects of proper cost, good applicability, and high precision.

A technical solution of the instrument for measuring velocity and direction of a groundwater flow according to the second aspect of the present disclosure is:

an instrument for measuring velocity and direction of a groundwater flow, including: the foregoing underwater detector;

a ground operation part, where the ground operation part and the underwater detector are connected through a cable.

Further, the ground operation part includes a winch, an operation panel is disposed on the winch, and the operation panel is connected to the processor module.

Further, the operation panel is further connected to a memory.

A third aspect of the present disclosure provides a working method of an instrument for measuring velocity and direction of a groundwater flow.

A technical solution of the working method of an instrument for measuring velocity and direction of a groundwater flow according to the third aspect of the present disclosure is:

a working method of an instrument for measuring velocity and direction of a groundwater flow, including:

descending the underwater detector to a specified depth;

using the operation panel to start the underwater detector and set a rotation speed of the infrared sensor module after the instrument for measuring velocity and direction of a groundwater flow is kept stationary for a preset time and the indicator points to a correct direction, and displaying, automatically by the processor module, obtained results of direction and velocity of water flow on the operation panel and recording the results in a memory at the same time; and using the operation panel to shut down the instrument for measuring velocity and direction of a groundwater flow after groundwater data of a specific depth is measured, descending the underwater detector to a next to-be-measured depth, and repeating the previous step.

The present disclosure has the following beneficial effects:

(1) An underwater detector and an instrument for measuring velocity and direction of a groundwater flow of the present disclosure both include an infrared sensor and a light source, identify velocity and direction of a groundwater flow in a manner of converting an optical signal into an electrical signal by using the photoelectric effect, and have high sensitivity and accuracy.

(2) A structure of a velocity and direction indicator of the present disclosure is simple and reliable, springs with different stiffness coefficients may be replaced according to different velocities, and an application range is wide.

(3) The underwater detector and the instrument for measuring velocity and direction of a groundwater flow of the present disclosure have simple principles, low operation requirements, and low cost.

BRIEF DESCRIPTION OF THE DRAWINGS

The accompanying drawings forming a part of the present disclosure are used for providing a further understanding of the present disclosure. Exemplary embodiments of the present disclosure and descriptions thereof are used for explaining the present disclosure, and do not constitute any inappropriate limitation to the present disclosure.

In the figures: 1—infrared sensor module; 2—electronic compass; 3—indicator; 4—light source; 5—sealing glass; 6—power assembly; 7—processor module; 8—metal counterweight; 9—spindle; 10—sealed enclosure; 11—cable; 12—winch; and 13—operation panel.

DETAILED DESCRIPTION

It should be noted that the following detailed descriptions are all exemplary and are intended to provide a further understanding of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Embodiment I

Figure 1:
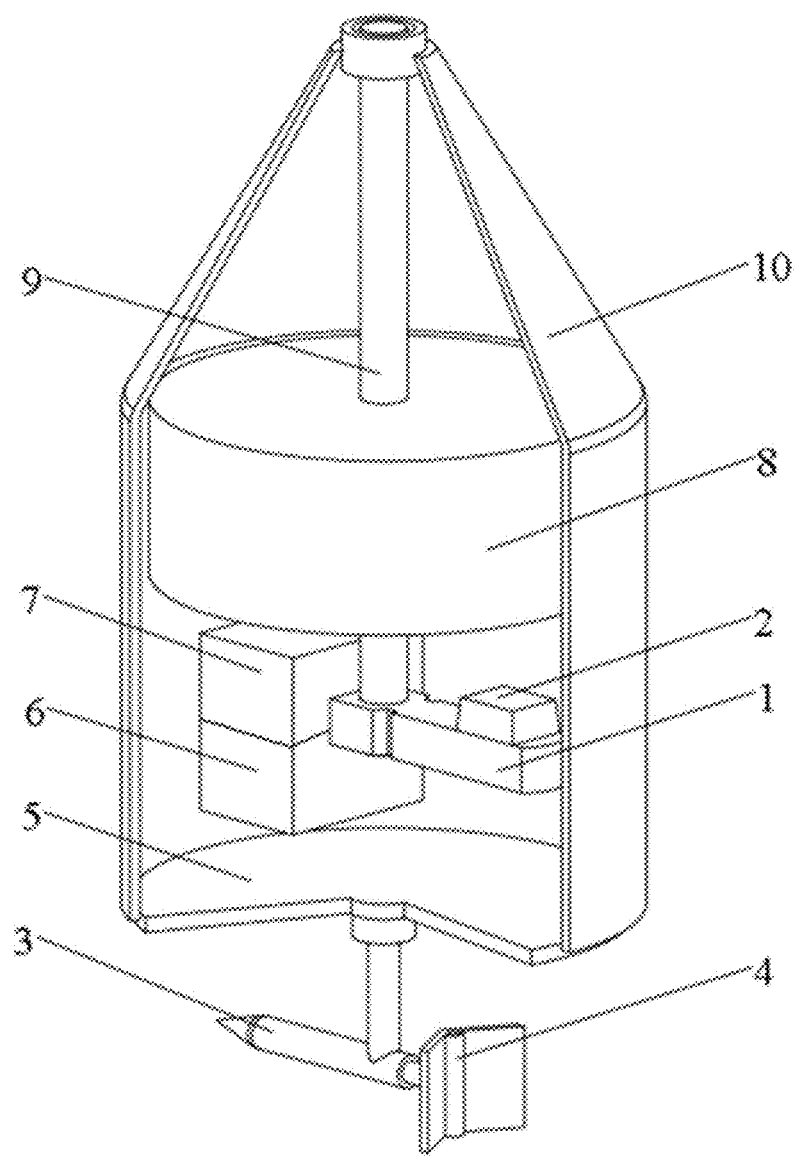
FIG. 1 is a schematic structural diagram of an underwater detector according to an embodiment of the present disclosure.

As shown in FIG. 1, an underwater detector of this embodiment includes:

a sealed enclosure 10, inside which a spindle 9, an infrared sensor module 1, and a processor module 7 are disposed, where the infrared sensor module 1 is capable of rotating around the spindle 9 at a fixed angular velocity along a horizontal plane; an electronic compass 2 is disposed on the infrared sensor module 1; and a bottom of the sealed enclosure 10 is connected to an indicator 3 through a rotary shaft, and the indicator 3 is capable of freely rotating around the rotary shaft on the horizontal plane under the action of a water flow;

the indicator 3 includes a head and a tail fin, a light source 4 configured to emit a light beam vertically upwards is disposed on the tail fin, and the light beam can be received by the infrared sensor module 1; the infrared sensor module 1 is configured to trigger the electronic compass 2 to work when receiving the light beam, and the electronic compass 2 is configured to record a real-time direction thereof relative to the spindle, which is then processed by the processor module 7 to obtain a direction of the water flow; and a spring is connected between the head and the tail fin; the infrared sensor module is further configured to directly transmit a moment of receiving the light beam to the processor module; and the processor module is configured to calculate a velocity of the water flow according to known relational expressions between a spring strain, a light beam signal appearance time, and a velocity of a water flow.

In a specific implementation, the processor module is configured to calculate an average value of the first direction reading and the last direction reading of the electronic compass as the direction of the water flow when the light beam is received by the infrared sensor module.

For example, a direction calculation formula is:

$$\theta = (\theta_1 + \theta_2)/2$$

where $\theta_1$ and $\theta_2$ are the first and the last direction readings of the compass respectively when an optical signal is received by the infrared sensor module, and an average value $\theta$ is obtained as the direction.

In the process that the processor module calculates the velocity of the water flow, a spring works in the stage of elastic deformation, and a tensile force to which the spring is subjected complies with Hooke's law:

$$F = k \cdot \Delta$$

An upper tail fin of the indicator is affected by the water flow and forms a pulling force on a metal rod, where a magnitude of the pulling force is equal to that of the tensile force of the spring and a direction of the pulling force is opposite to that of the tensile force, and the pulling force may be expressed as:

$$k \cdot \Delta x = 0.5 C \rho S V^2$$

where k is a stiffness coefficient, $\Delta x$ is a spring deformation amount, C is a drag coefficient, $\rho$ is the density of water, s is a vertical cross-sectional area, and v is the velocity of water.

A relationship between the spring deformation amount $\Delta x$ and a light beam signal appearance time may be solved by using the following formula:

$$\Delta x = \frac{a}{2\sin(\overline{\omega} t_1)} - r_0$$

where a is a short side length of the rectangular infrared sensor, $r_0$ is a distance from the light source to the spindle when the water flow is at rest, $\overline{\omega}$ is a preset rotational angular velocity, and $t_1$ is a light beam signal appearance time length.

The velocity of the water flow may be obtained by using the relationships between the spring deformation amount, the light beam signal appearance time, and the velocity of the water flow.

Specifically, the head includes a hollow column, a front end of the hollow column is sealed by a conical fairing, a rod is inserted into a rear end of the hollow column, the rod and the conical fairing are connected through a spring, and the other end of the rod is connected to the tail fin.

In an optional implementation, the hollow column may be a hollow cylinder.

The hollow cylinder has less resistance in water, and may be used as a preferred implementation.

It should be noted that a column of another shape may alternatively be used as the hollow column.

In an optional implementation, the tail fin is a V-shaped tail fin that is perpendicular to the horizontal plane.

In another optional implementation, the tail fin may alternatively be conical or in another shape.

It should be noted that choosing a V-shaped tail fin makes it more convenient to dispose the light source behind the tail fin, and in addition, generate resistance to drag the spring under the action of a water flow.

In a specific implementation, the infrared sensor module rotates around the spindle under the driving of a power assembly.

Specifically, the power assembly includes: an electric motor, a gear set, a transmission shaft, and an enclosure.

The infrared sensor module includes several infrared sensors.

In a specific implementation, a metal counterweight is mounted on the spindle to ensure stability of the instrument in water.

Specifically, the bottom of the sealed enclosure is made of a transparent material, for example, sealing glass 5.

In a specific implementation, the rotary shaft is a first ball bearing.

In a specific implementation, the spindle and the sealed enclosure are connected through a second ball bearing.

Embodiment II

Figure 2:
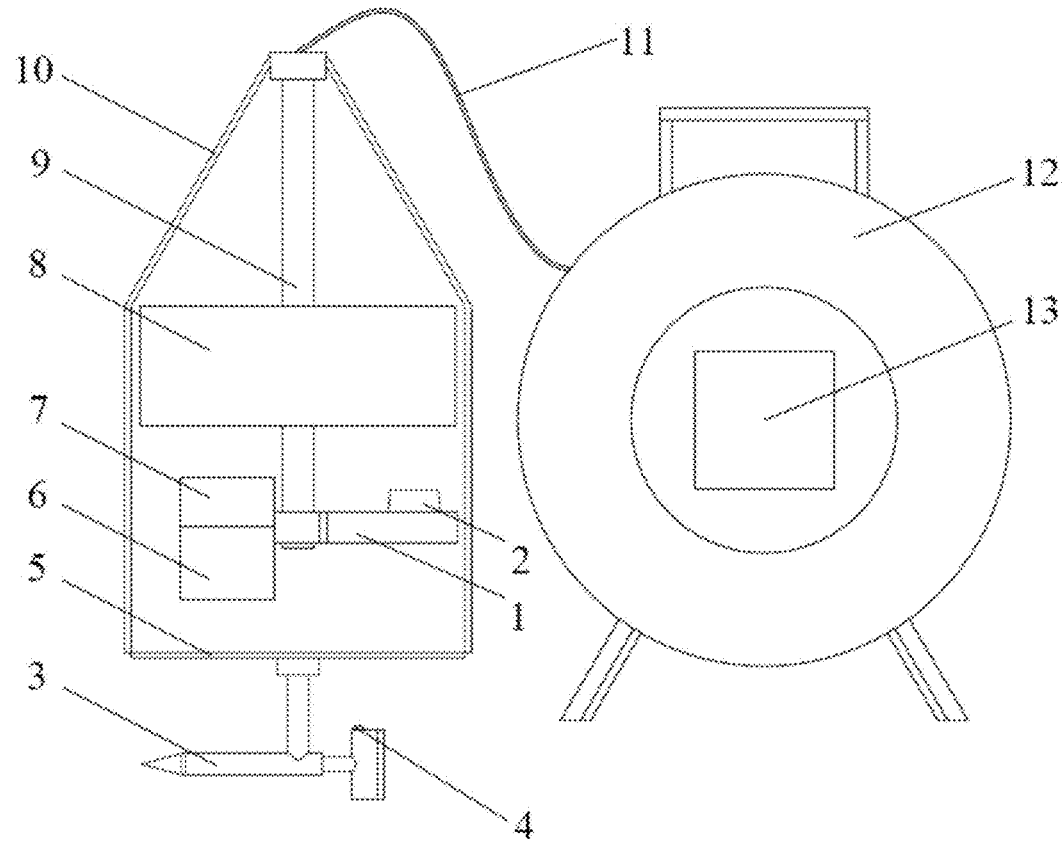
FIG. 2 is a schematic structural diagram of an instrument for measuring velocity and direction of a groundwater flow according to an embodiment of the present disclosure.

As shown in FIG. 2, an instrument for measuring velocity and direction of a groundwater flow of this embodiment includes:

an underwater detector as is shown in FIG. 1; and a ground operation part, where the ground operation part and the underwater detector are connected through a cable 11.

In a specific implementation, the ground operation part includes a winch 12, an operation panel is disposed on the winch 13, and the operation panel 13 is connected to the processor module 7.

Specifically, the operation panel includes: a display, a relevant key, and a memory.

Where, the memory may be a data storage device such as a ROM or a USB.

Embodiment III

A working method of an instrument for measuring velocity and direction of a groundwater flow of this embodiment includes the following steps.

Step 1: Descend an underwater detector to a specified depth.

Before Step 1, the method also includes connecting a detector part and a winch through a cable, checking whether a device inside the detector is operating normally through a trial operation of an operation panel, checking watertightness of the detector, and turning on a light source on the velocity and direction indicator when there is no problem.

Specifically, using a borehole as an example, the detector part is placed into the borehole, and by observing the scale on the cable, the detector is descended to the specified depth at a constant speed by using a handle on the winch.

Step 2: Use the operation panel to start the underwater detector and set a rotation speed of the infrared sensor module after the instrument for measuring velocity and direction of a groundwater flow is kept stationary for a preset time (for example: 10 s) and the indicator points to a correct direction, and display, automatically by the processor module, obtained results of direction and velocity of water flow on the operation panel and record the results in a memory at the same time.

Specifically, one or more sets of data may be recorded at the same depth according to requirements of an operator. If the deformation of the spring is too large and exceeds the application scope of Hooke's law, the processor displays that the measurement range is exceeded on the display of the operation panel, and the spring needs to be replaced with a spring with a larger stiffness coefficient.

Step 3: Use the operation panel to shut down the instrument for measuring velocity and direction of a groundwater flow after groundwater data of a specific depth is measured, descend the underwater detector to a next to-be-measured depth, and repeat the previous step.

After all the data are measured, the detector is pulled back by the winch at a constant speed to avoid friction and collision between the detector and the wall in the borehole.

Although the specific implementations of the present disclosure have been described above with reference to the accompanying drawings, it does not limit the protection scope of the present disclosure. It is to be understood by a person skilled in the art that based on the technical solutions of the present disclosure, various modifications or deformations that made by a person skilled in the art shall all fall within the protection scope of the present disclosure without creative efforts.

What is claimed is:

1. An underwater detector, comprising:
a sealed enclosure, inside which a spindle, an infrared sensor module, and a processor module are disposed, wherein the infrared sensor module is capable of rotating around the spindle at a fixed angular velocity along a horizontal plane; an electronic compass is disposed on the infrared sensor module; and a bottom of the sealed enclosure is connected to an indicator through a rotary shaft, and the indicator is capable of freely rotating around the rotary shaft on the horizontal plane under the action of a water flow;

the indicator comprises a head and a tail fin, a light source configured to emit a light beam vertically upwards is disposed on the tail fin, and the light beam can be received by the infrared sensor module; the infrared sensor module is configured to trigger, when receiving the light beam, the electronic compass to work, and the electronic compass is configured to record a real-time direction thereof relative to the spindle, wherein the real-time direction is processed by the processor module to obtain a direction of the water flow; and a spring is connected between the head and the tail fin; the infrared sensor module is further configured to directly transmit a moment of receiving the light beam to the processor module; and the processor module is configured to calculate a velocity of the water flow according to known relational expressions between a spring strain, a light beam signal appearance time, and a velocity of a water flow.

2. The underwater detector according to claim 1, wherein the processor module is configured to calculate an average value of the first direction reading and the last direction reading of the electronic compass as the direction of the water flow when the light beam is received by the infrared sensor module.

3. The underwater detector according to claim 1, wherein the head comprises a hollow column, a front end of the hollow column is sealed by a conical fairing, a rod is inserted into a rear end of the hollow column, the rod and the conical fairing are connected through a spring, and the other end of the rod is connected to the tail fin.

4. The underwater detector according to claim 3, wherein the tail fin is a V-shaped tail fin that is perpendicular to the horizontal plane.

5. The underwater detector according to claim 1, wherein the infrared sensor module rotates around the spindle under the driving of a power assembly.

6. The underwater detector according to claim 1, wherein a metal counterweight is mounted on the spindle to ensure stability of the instrument in water;

the bottom of the sealed enclosure is made of a transparent material;

the rotary shaft is a first ball bearing; or the spindle and the sealed enclosure are connected through a second ball bearing.

7. An instrument for measuring velocity and direction of a groundwater flow, comprising:

the underwater detector according to claim 1; and a ground operation part, wherein the ground operation part and the underwater detector are connected through a cable.

8. The instrument for measuring velocity and direction of a groundwater flow according to claim 7, wherein the ground operation part comprises a winch, an operation panel is disposed on the winch, and the operation panel is connected to the processor module.

9. The instrument for measuring velocity and direction of a groundwater flow according to claim 8, wherein the operation panel is further connected to a memory.

10. A working method of the instrument for measuring velocity and direction of a groundwater flow according to claim 7, comprising:

descending the underwater detector to a specified depth;

using the operation panel to start the underwater detector and set a rotation speed of the infrared sensor module after the instrument for measuring velocity and direction of a groundwater flow is kept stationary for a preset time and the indicator points to a correct direction, and displaying, automatically by the processor module, obtained results of direction and velocity of water flow on the operation panel and recording the results in a memory at the same time; and using the operation panel to shut down the instrument for measuring velocity and direction of a groundwater flow after groundwater data of a specific depth is measured, descending the underwater detector to a next to-be-measured depth, and repeating the previous step.

* * * * *